US 6,778,552 B1

(12) United States Patent
James et al.

(10) Patent No.: US 6,778,552 B1
(45) Date of Patent: *Aug. 17, 2004

(54) METHOD AND SYSTEM FOR PARTITIONING AN EXTENDED NETWORK OF 1394B DEVICES INTO SUBCLUSTERS OF FULLY CAPABLE AND PARTIALLY CAPABLE NODES

(75) Inventors: David James, Palo Alto, CA (US); Jose Diaz, San Jose, CA (US); Glen David Stone, Campbell, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 540 days.

This patent is subject to a terminal disclaimer.

(21) Appl. No.: 09/634,096

(22) Filed: Aug. 8, 2000

(51) Int. Cl.[7] ................................. H04J 3/22
(52) U.S. Cl. ................... 370/465; 370/401; 710/11
(58) Field of Search ................. 370/466, 447, 370/401; 710/10, 240, 11

(56) References Cited

U.S. PATENT DOCUMENTS

| | | | | |
|---|---|---|---|---|
| 6,157,650 A | * | 12/2000 | Okuyama et al. | 370/401 |
| 6,272,581 B1 | * | 8/2001 | Leung et al. | 710/313 |
| 6,519,657 B1 | * | 2/2003 | Stone et al. | 710/10 |
| 6,529,984 B1 | * | 3/2003 | Teener et al. | 710/240 |
| 6,636,914 B1 | * | 10/2003 | Johas Teener | 710/240 |
| 6,639,918 B1 | * | 10/2003 | Hauck et al. | 370/462 |
| 2002/0181497 A1 | * | 12/2002 | Mano et al. | 370/466 |
| 2004/0037309 A1 | * | 2/2004 | Hauck et al. | 370/462 |

* cited by examiner

Primary Examiner—Seema S. Rao
Assistant Examiner—Michael J Moore, Jr.
(74) Attorney, Agent, or Firm—Wagner, Murabito & Hao LLP

(57) ABSTRACT

A method and system for allowing a network of devices (nodes) which conform to standards with different physical interfaces and communication protocols to share a communication link. In one embodiment of the present invention, a 1394a compliant node is connected to a partially compliant bi-lingual 1394b node. The partially compliant bi-lingual 1394b node is connected to a fully compliant 1394b node. Thus, the partially compliant bi-lingual 1394b node provides a bridge between the 1394a node and the fully compliant 1394b node. The fully compliant 1394b node has a physical interface in compliance with the 1394b standard and arbitrates according to either the 1394b standard or the 1394a standard. The partially compliant 1394b node has a physical interface in compliance with the 1394b standard but arbitrates according to the 1394a standard. The 1394a node has a physical interface in compliance with the 1394a standard and arbitrates according to the 1394a standard.

14 Claims, 8 Drawing Sheets

METHOD AND SYSTEM FOR PARTITIONING AN EXTENDED NETWORK OF 1394B DEVICES INTO SUBCLUSTERS OF FULLY CAPABLE AND PARTIALLY CAPABLE NODES

FIELD OF THE INVENTION

Embodiments of the present invention relate to the field of networked devices. Specifically, embodiments of the present invention relate to a system and method for partitioning an extended network of IEEE 1394b devices into subclusters of fully capable nodes which communicate with the 1394b standard and subclusters of partially capable nodes which communicate using the 1394a standard.

BACKGROUND ART

One conventional technique for media to share a high performance serial bus can be found in the IEEE Std 1394a -2000 specification (herewithin 1394a standard). Devices which conform to that specification may be known as 1394a compliant devices. A second technique for media to share a high speed serial bus is contemplated in the in development IEEE P1394b specification (herewithin the 1394b standard). Devices which conform to the latter specification may be known as 1394b compliant devices. A need exists for an efficient design migration path from nodes compliant with the 1394a standard to nodes compliant with the, 1394b standard. Creating such an efficient migration path is problematic because the two standards define different bus communication (e.g., arbitration) mechanisms and they have different physical layer characteristics.

Some differences in the above-mentioned arbitration standards may be understood by referring to FIG. 1A, which illustrates an exemplary sequence of bus transfers according to the 1394a standard. The sequence includes an A fairness interval 202, during which each device has an opportunity to transfer exactly one packet 208. After a device transfers a packet 208, it must wait for a new A fairness interval 202 to begin, which is indicated by an arbitration reset gap 204. Thus, once device A has transferred its first packet 208 it must wait for the arbitration reset gap 204 to transfer a second packet 208. A device which has not yet transferred a packet 208 in a given A fairness interval 202 only needs to wait for a subaction gap 206, which is shorter than an arbitration reset gap 204.

A further characteristic of the 1394a standard is that a device may not request bus access until the arbitration reset gap 204 or subaction gap 206 has completed, depending upon whether the device has transferred a packet 208 in the A fairness interval 202 or not. After the request, there may be a time lag before that device is granted bus access. Another characteristic of the 1394a standard is that the same device (node) always serves as the root node once selected after a bus reset.

FIG. 1B illustrates an exemplary sequence of bus transfers according to the 1394b standard. Included in the sequence is a B fairness interval 212 during which each device has an opportunity to transfer exactly one packet 208. After a device transfers a packet 208, it must wait for a new B fairness interval 212 to begin. However, the 1394b standard does not call for arbitration reset gaps, unlike the 1394a standard (FIG. 1A, 204). Furthermore, the 1394b standard allows a device to issue a request for bus access while another device is still transferring a packet 208. Consequently, the delay between devices transferring packets 208 may be less than that which occurs under the 1394a standard. The 1394a standard also calls for bus grants 210, although they are not shown in FIG. 1A. An additional difference between the two standards is that in the 1394b standard, the last device to transfer a packet 208 serves as the arbitrator, rather than using a predetermined arbitrator as in the 1394a standard. Other differences exist between the two standards as well.

Differences exist between the physical layers (PHY) as well. One prominent difference is the 1394a serial bus uses DC-coupling, whereas the 1394b serial bus uses DC-free coding. This difference may allow 1394b compliant devices to have superior noise rejection.

The 1394a bus is used extensively today; however, mixed systems are envisioned. The above differences between the 1394a and 1394b standards may make it problematic to migrate from 1394a compliant devices to 1394b compliant devices that share a common bus. The changes in the 1394b standard offer desirable improvements of which many designers would like to take advantage. Unfortunately, designers may face a difficult challenge of migrating their designs from the 1394a standard to the 1394b standard. First, the designers must learn the 1394b arbitration protocol and conform their design to it. Second, the designers must modify the physical layer to account for the 1394b standard. Thus, designers face a difficult challenge of incorporating these changes and will risk design flaws. Clearly, it will be costly for designers to make these changes and designers will face a cost/benefit tradeoff.

SUMMARY OF THE INVENTION

Therefore, it would be advantageous to provide a method and system for allowing 1394a compliant devices and 1394b compliant devices to physically share a media bus and to communicate over the shared bus with a protocol each can understand. A need exists for a method and system which allows for a migration path from the 1394a standard to the 1394b standard (and back) which also satisfies the needs of a wide range of developers. For instance, designers who wish to take full advantage of the 1394b improvements may desire to incorporate the 1394b protocol at both the physical layer and at the arbitration layer. A need also exists for a simpler choice, which does not force the designer to incorporate the newer arbitration standard in the design. A still further need exists for a method and system which allows designs of the simpler and the fully compliant (capable) choice to work together.

Embodiments of the present invention provide a method and system for allowing 1394a compliant nodes and 1394b compliant nodes to physically share a media bus and to communicate over the shared bus using a partially compliant 1394b node to bridge the other two nodes. Embodiments of the present invention provide a method and system which allow a migration path from the 1394a standard to the 1394b standard which satisfies the needs of a wide range of developers. Embodiments of the present invention allow designers who wish to take full advantage of the 1394b improvements to be able to incorporate the 1394b protocol at both the physical layer and at the communication layer. Embodiments allow designers a simpler choice, which does not force the designer to incorporate the newer communication standard in the design. Embodiments of the present invention provide a method and system which allow both the simpler and the fully compliant design choice to be used together. Embodiments of the present invention provide these advantages and others not specifically mentioned above but described in the sections to follow.

A method and system for allowing a network of devices (nodes) which conform to standards with different physical interfaces and communication protocols to share a communication link is disclosed. In one embodiment of the present invention, a 1394a compliant node is connected to a partially compliant bi-lingual 1394b node. The partially compliant bi-lingual 1394b node is connected to a fully compliant 1394b node. Thus, the partially compliant bi-lingual 1394b node provides a bridge between the 1394a node and the fully compliant 1394b node. The fully compliant 1394b node has a physical interface in compliance with the 1394b standard and arbitrates according to either the 1394b standard or the 1394a standard. The partially compliant 1394b node has a physical interface in compliance with the 1394b standard but arbitrates according to the 1394a standard. The 1394a node has a physical interface in compliance with the 1394a standard and arbitrates according to the 1394a standard.

In another embodiment, the partially compliant bi-lingual 1394b node is connected to a second partially compliant 1394b node and communicates with a 1394a compliant protocol. In still another embodiment, the fully compliant bi-lingual 1394b node connects to another fully compliant 1394b node and communicates using a 1394b compliant protocol.

Another embodiment of the present invention provides a method of allowing communication between a network of devices which have dissimilar communication interfaces and arbitration protocols. The method first establishes a network of connections by connecting a 1394a compliant node with a partially compliant 1394b node, which communicate using a 1394a compliant protocol. Then, the partially compliant 1394b node is connected to a second 1394b node, which communicate using a 1394a communication protocol. In one embodiment, the second 1394b node is then connected to a fully compliant 1394b node, which communicate with each other using a 1394b compliant protocol. In another embodiment, the second 1394b node is then connected to a 1394a node, which communicate with each other using a 1394a compliant protocol.

A still further embodiment provides for a device which provides a bridge between devices with dissimilar physical interfaces networked on a communication link. The device comprises a first port which conforms to the 1394a physical standard and a second port which conforms the 1394b physical standard. The device is capable of arbitration using the 1394a standard on either port.

DETAILED DESCRIPTION OF THE INVENTION

Figure 1A:
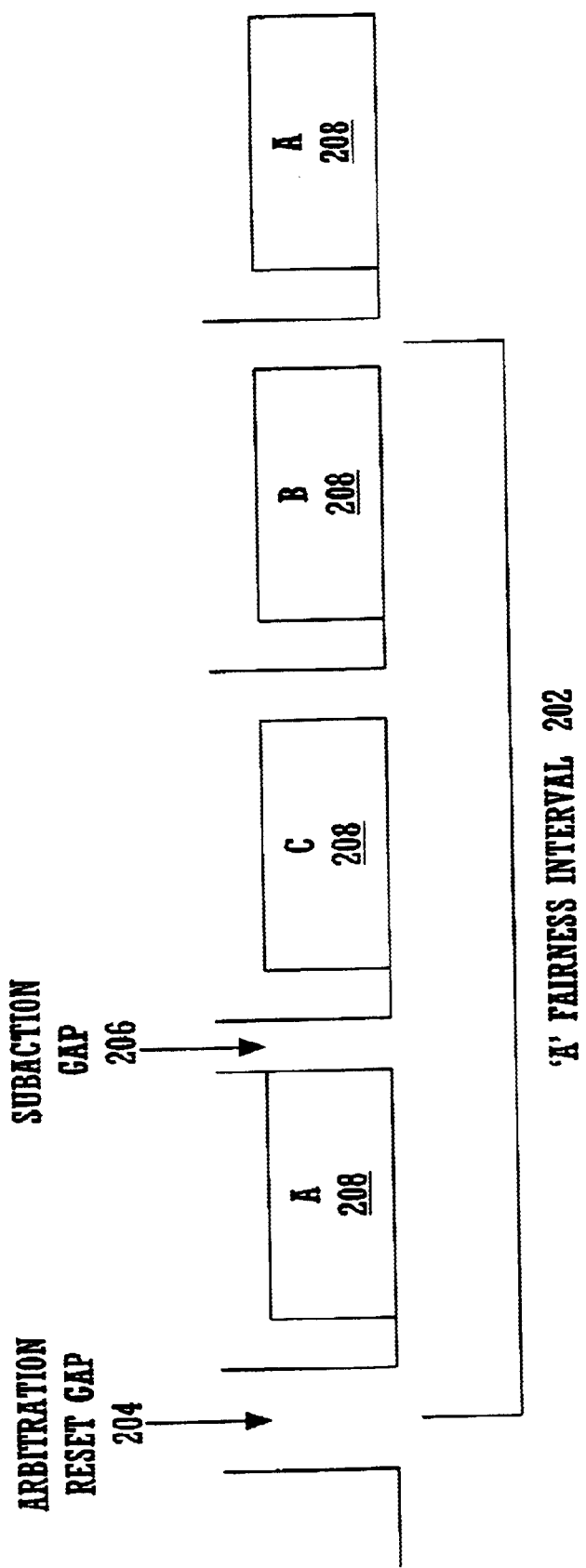
FIG. 1A is a diagram of a 1394a style fairness interval, according to conventional art.
Figure 1B:
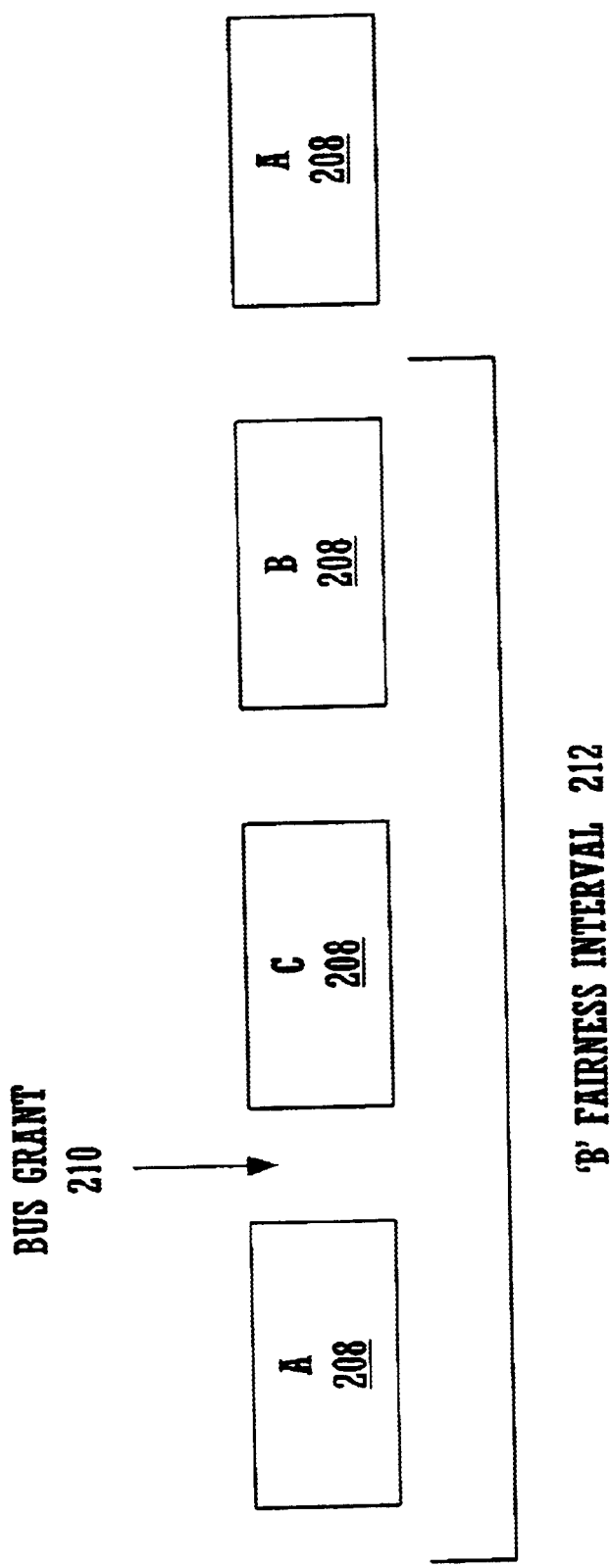
FIG. 1B is a diagram of a 1394b style fairness interval, according to conventional art.

In the following detailed description of embodiments of the present invention, a method, system and device for partitioning an extended network of IEEE 1394b devices into subclusters of fully capable nodes which arbitrate with the 1394b standard and subclusters of partially capable nodes which arbitrate using the 1394a standard, numerous specific details are set forth in order to provide a thorough understanding of embodiments of the present invention. However, it will be recognized by one skilled in the art that embodiments of the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Embodiments of the present invention provide a system and method for partitioning an extended network of IEEE 1394b devices into subclusters of fully capable nodes which arbitrate with the 1394b standard and subclusters of partially capable nodes which arbitrate using the 1394a standard. In this fashion, a node in the partially compliant subcluster may use the same arbitration standard as an adjacent 1394a compliant node. Additionally, the partially compliant 1394b nodes can be designed economically.

PARTITIONING AN EXTENDED NETWORK OF DEVICES INTO SUBCLUSTERS

Embodiments of the present invention provide a system and method for partitioning an extended network of IEEE 1394b devices into subclusters of fully capable nodes which arbitrate with the 1394b standard and subclusters of partially capable nodes which arbitrate using the 1394a standard. In this fashion, a node in the partially compliant subcluster may use the same arbitration standard as an adjacent 1394a compliant node. Additionally, the partially compliant 394b nodes can be designed economically.

A 1394a network (A network) is composed of only 1394a compliant nodes whereas a 1394b network (B network) is composed of only 1394b fully or partially compliant devices. A fully compliant 1394b node complies with both the physical layer standard (e.g., uses the 1394b high performance serial bus) and communication (e.g., arbitration) protocols. However, a partially compliant 1394b node complies with the 1394b physical layer standards, but not the 1394b communication protocol.

Figure 2:
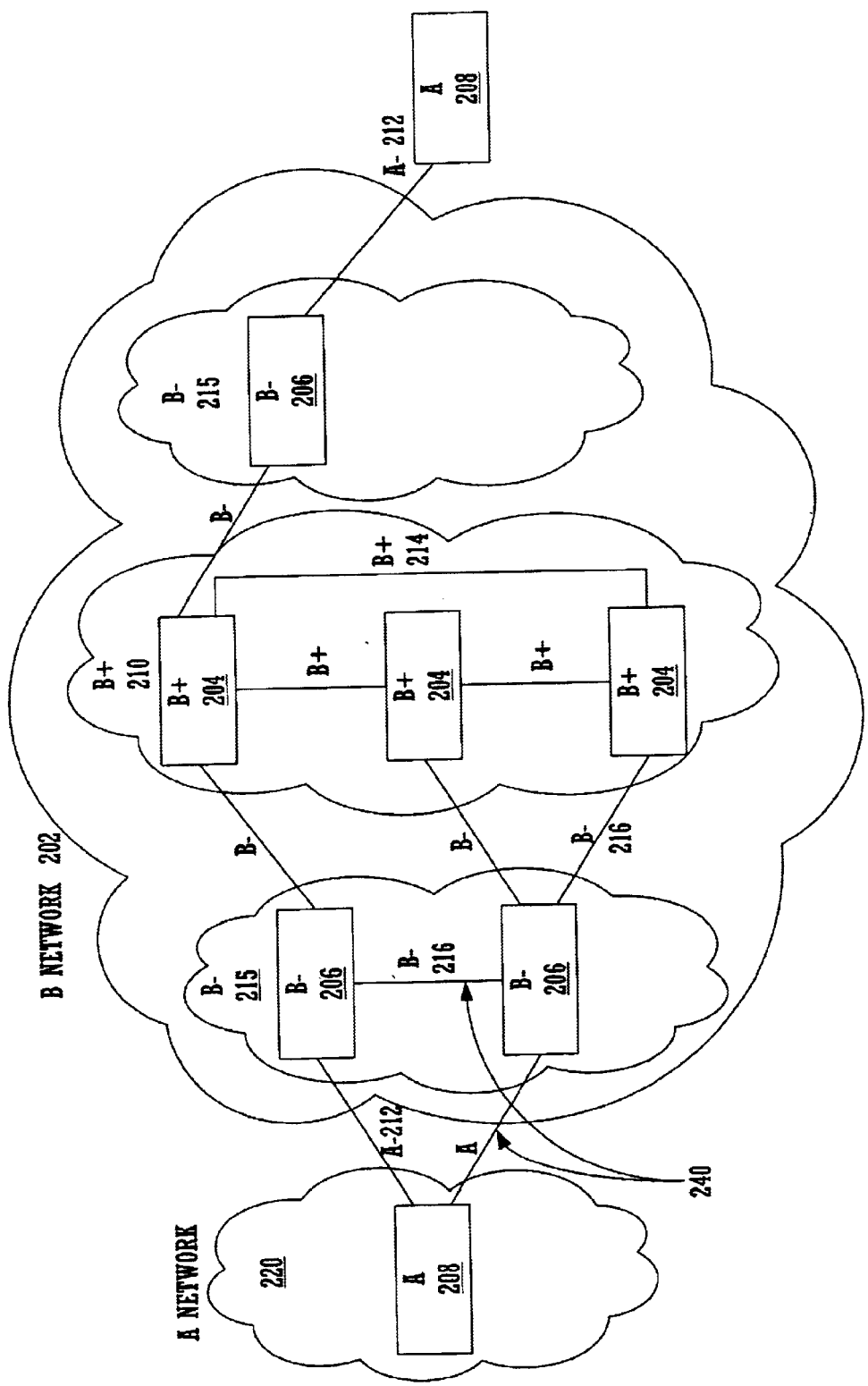
FIG. 2 is a diagram illustrating an example topology of an extended network of fully capable 1394b devices, partially capable 1394b devices and individual 1394a compliant devices, in which an embodiment of the present invention may be practiced.

FIG. 2 is a diagram illustrating an example topology of an extended 1394b network 202 of fully capable 1394b nodes (B+ nodes) 204, partially capable 1394b nodes (B− nodes) 206, an A network 220, and an individual 1394a compliant nodes 208. As is seen, the B− node 206 may connect directly to an A node 208 or to a B+ node 204. This is because the B− nodes 206 share a physical interface in common with both the A nodes 208 and the B+ nodes 204. However, the A nodes 208 and the B+ nodes 204 may not connect together, because they do not share a physical interface in common.

Referring still to FIG. 2, the connections between the nodes are labeled as A, B− and B+ (212, 216, 214). The A connections 212 conform to the 1394a standard at the physical layer, and the 1394a standard is used for information transfers. The B+ connections 214 conform to the 1394b standard at the physical layer, and the 1394b protocol is used for information transfers. However, the B− connections 216 conform to the 1394b standard at the physical layer, while the 1394a standard is used for information transfers. In this fashion, the B− nodes 206 of embodiments of the present invention may serve as a bridge between the fully compliant 1394b nodes 204 (B+ nodes) and the A nodes 208. The B network 202 is divided into a B+ subcluster 210 and two B− subclusters 215. It may be stated that the 1394a arbitration layer is pushed into the B network 202 by one layer, for example, a B− subcluster 215. It may be stated that the B+ subcluster 210 retains the performance advantages of the 1394b standard.

The B+ nodes 204 are capable of arbitrating with either the 1394a standard or the 1394b standard. Thus, when a B+ node 204 communicates with another B+ node 204, it uses the higher performance 1394b arbitration standard. However, when a B+ node 204 communicates with a B− node 206 it must use the 1394a standard, as the B− nodes 206 are not capable of arbitration using the 1394b standard.

Table 1 summarizes the type of arbitration which is used between two nodes of a given type, as well as the connection type. For example, when two B+ nodes 204 communicate they use the 1394b arbitration standard. When all other nodes communicate, they use the 1394a arbitration standard. While this application refers to the type of arbitration used when two nodes communicate, it will be borne in mind that this is exemplary of the differences between the 1394a communication and 1394b communication standard. Therefore, the present invention is not to be limited to arbitration differences when defining the differences between the exchange of information over a 1394a serial bus and a 1394b serial bus. Table 1 also summarizes the type of physical layer (PHY) used when two nodes communicate.

TABLE 1

| Node 1 | Node 2 | Connection | Arbitration | PHY |
|--------|--------|------------|-------------|-----|
| B+ | B+ | B+ | B | B |
| B+ | B− | B− | A | B |

TABLE 1-continued

| Node 1 | Node 2 | Connection | Arbitration | PHY |
|--------|--------|------------|-------------|-----|
| B+ | A | NA | NA | NA |
| B− | B− | B− | A | B |
| B− | A | A | A | A |
| A | A | A | A | A |

As Table 1 shows, a B− node 206 will use a B physical connection with another B− node 206, but an A physical connection with an A node 208. A B+ node 204 will always use a B physical connection. For example, the physical layer (PHY) may be adapted to interface with the IEEE 1394b high performance serial bus.

Figure 3:
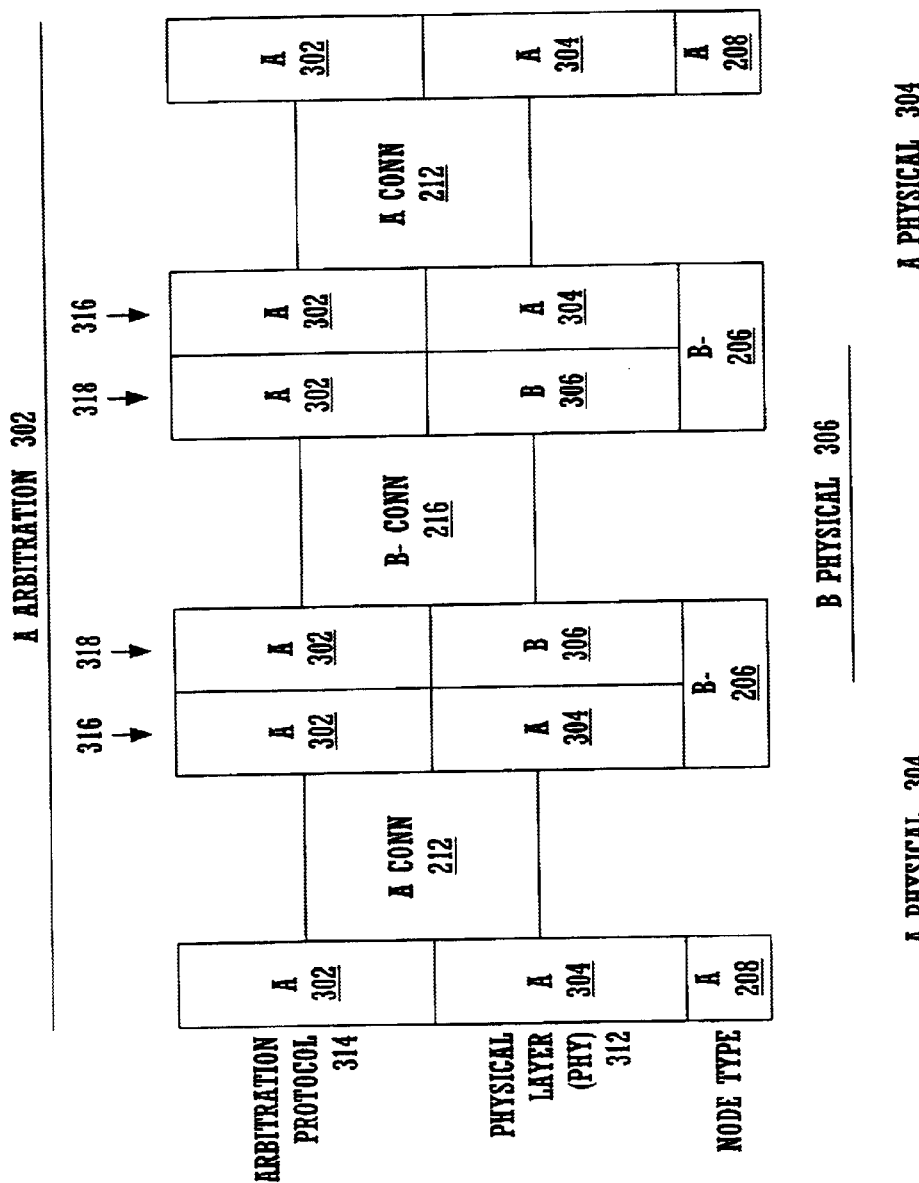
FIG. 3 is a network diagram illustrating two A nodes and two B– nodes along with the physical layers and arbitration protocols used, according to an embodiment of the present invention.

FIG. 3 illustrates a network of two A nodes 208 and two B− nodes 206 along with the physical layers 312 and arbitration protocols 314 used, according to one embodiment of the present invention. The A nodes 208 only need to have a single type of physical layer and arbitration protocol, in this embodiment. The B− nodes 206 are each bilingual nodes. Each has a first port 316 with a 1394a physical layer 304 and a 1394a arbitration layer 302. Each B− node 206 also has a second port 318 with a 1394b physical layer 306 and a 1394a arbitration layer 302. In this fashion, the B− physical layer 306 extends between the second ports 318 of the B− nodes 206. However, the 1394a physical layer 304 extends between the first port 316 of a B− node 206 and an A node 208. The 1394a arbitration protocol 302 is used across all connections (212, 216), in this embodiment.

Figure 4:
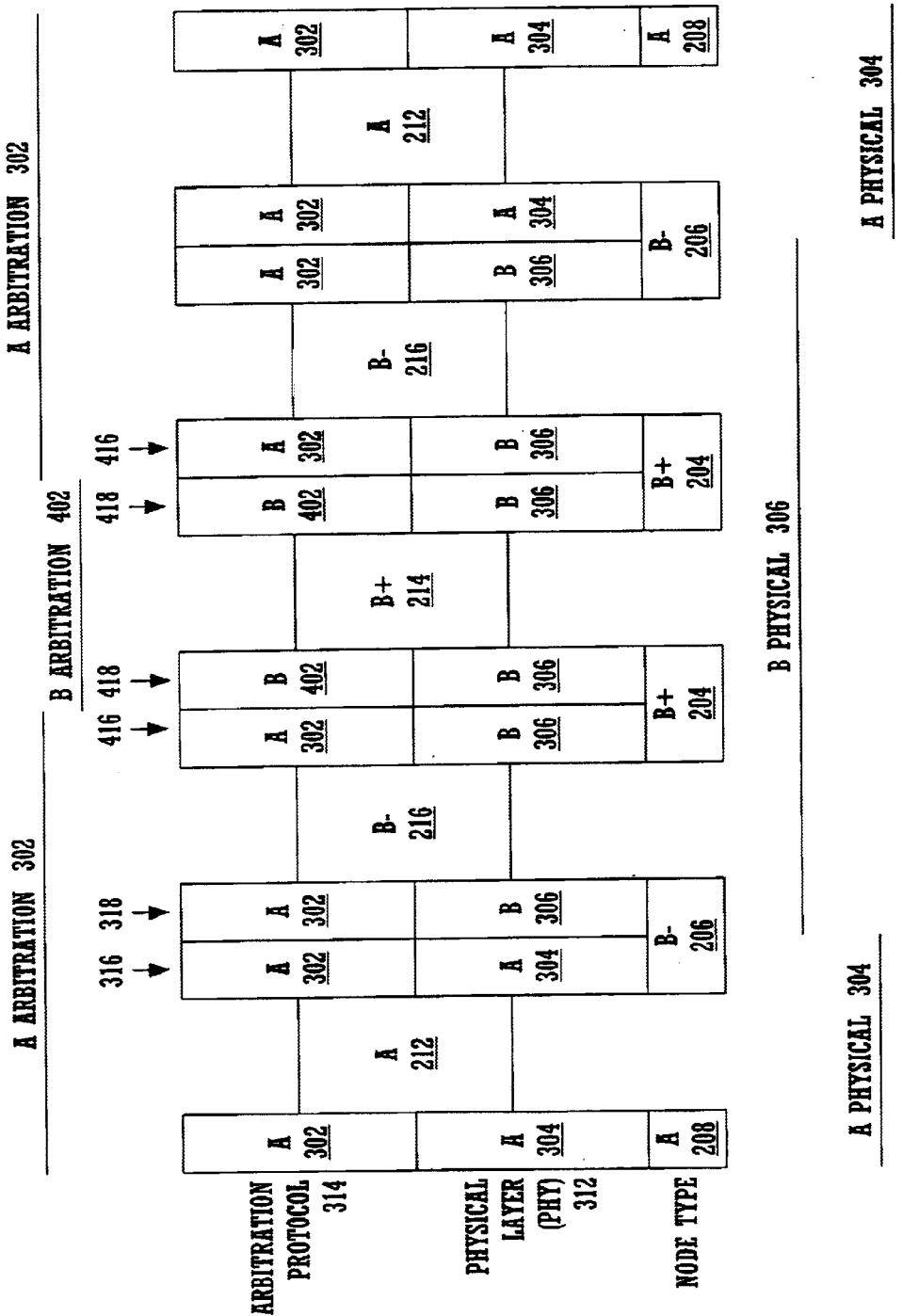
FIG. 4 is a network diagram illustrating two A nodes, two B– nodes, and two B+ nodes, along with the physical layers and arbitration protocols used, according to an embodiment of the present invention.

FIG. 4 illustrates an embodiment of the present invention in which B+ nodes 204 are present in the network. The B+ nodes allow this network to have a subcluster of nodes that takes advantage of both the physical and communication benefits of the 1394b standard. Thus, a designer who wished to have a cluster of nodes with the higher performance of the 1394b standard could do so, while still having other nodes with lower performance. Therefore, the overall network provides for flexibility in performance and economic choices. The B+ nodes 204 are bilingual, having a first port 416 and a second port 418. In this embodiment, the B physical layer 306 extends between the ports of the B− nodes 206, which are adjacent to the B+ nodes 204. The 1394b arbitration protocol 402 is only used between the second ports 418 of B+ nodes 204, which are adjacent to another B+ node 204. Stated another way, the A physical layer 304 extends into the first port 316 of the B− nodes 206. However, the A arbitration layer 302 extends one layer further, for example, to the first port 416 of the B+ nodes 204.

Figure 5:
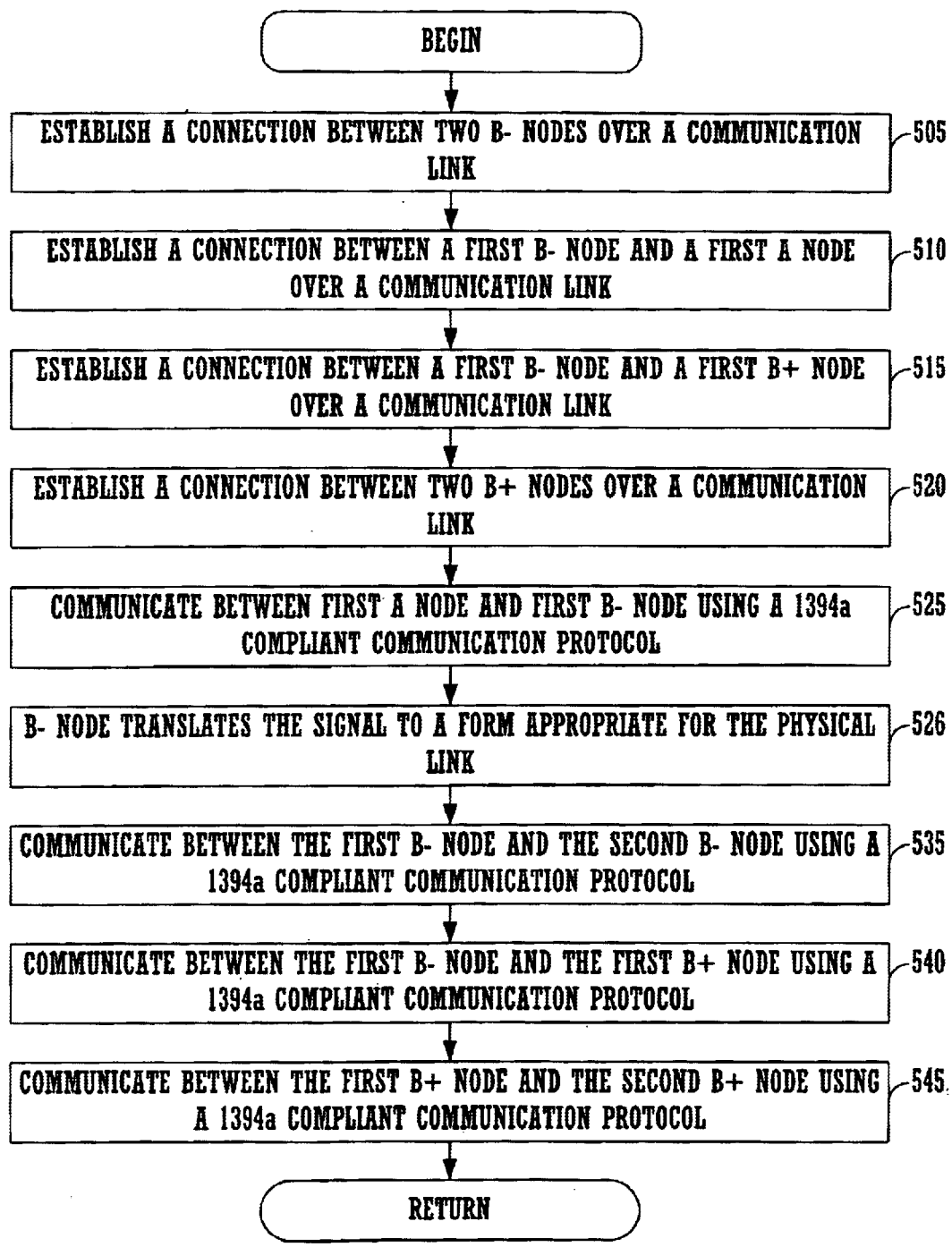
FIG. 5 is a flowchart illustrating steps of partitioning an extended network of nodes into a B+ subcluster and a B– subcluster, according to an embodiment of the present invention.

FIG. 5 illustrates the steps of a process of partitioning an extended network of nodes into a B+ subcluster 210 and a B− subcluster 215, according to an embodiment of the present invention. In this embodiment, the extended network 202 contains both B+ nodes 204 and B− nodes 206; however, the present invention is well suited to operating without B+ nodes 204.

In step 505, a connection is established between two B− nodes 206 over a communication link 240, which may be 1394b compliant. For example, it may be an IEEE 1394b high performance serial bus. In step 510, a connection is established between a B− node 206 and an A node 208. This connection is made over a 1394a compliant physical link. For example, this may be an IEEE 1394a high performance serial bus In step 515, a connection is made between a B− node 215 and a B+ node 210. This connection is made over a 1394b compliant communication link. Then, in step 520, a connection is made between two B+ nodes 204. This connection may be made over a 1394b compliant communication link.

In step 525, the 1394a compliant node 208 and the B– node 206 communicate using a 1394a compliant protocol. In step 526, the B– node 206 translates the signal received from the 1394a compliant link into a form which is suitable for transfer over a 1394b compliant link. For example, the information being transferred may be encoded with a nearly equal number of ones and zeros within each segment for transfer on the 1394b serial bus. However, this embodiment of the present invention does not limit the translation done by a B– node 206 to this example. In another embodiment, the B– node 206 translates the signal in the reverse direction. In steps 535, 540, and 545 two nodes communicate using the appropriate protocol, as is defined herein.

Figure 6:
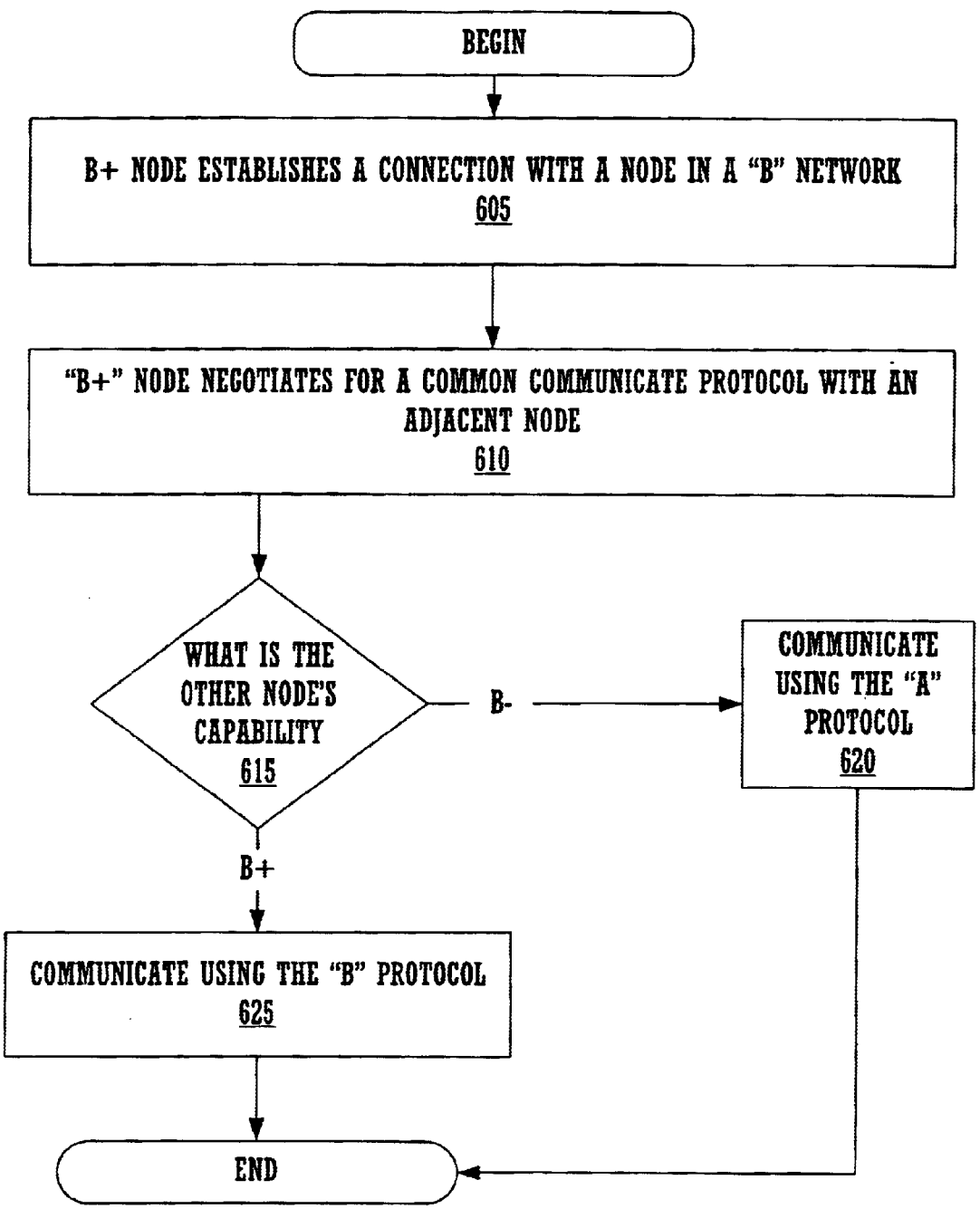
FIG. 6 is a flowchart illustrating steps of a process of a B+ node determining the arbitration protocol to be used with an adjacent node, according to an embodiment of the present invention.

FIG. 6 illustrates the steps of a process of a B+ node 204 determining the arbitration protocol to be used with an adjacent node, according to an embodiment of the present invention. In step 605, a B+ node 204 establishes a connection with another node in the extended B network 202. This may be a node which is physically adjacent to the B+ node 204 and may be either a B+ node 204a or a B– node 206.

In step 610, the B+ node 204 negotiates with the adjacent node for a desired arbitration protocol. In step 615, the arbitration capability of the adjacent node is determined. If the adjacent node is a B– node 206, then the two nodes may use the 1394a arbitration protocol 302, in step 620. In one embodiment, this may be done by a node may include information about its capabilities in a self-identification (self-ID) command, which it issues to adjacent devices after a bus reset. However, embodiments of the present invention are not limited to this method. Those of ordinary skill in the art will recognize that embodiments of the present invention are well suited to other methods for the B+ nodes 204 to negotiate a desired arbitration protocol with a neighbor.

If the adjacent node is a B+ node 204, then the two nodes may use the 1394b arbitration protocol 402, in step 625. In this fashion, the B+ nodes 204 may take advantage of what may be superior performance of the 1394b protocol 402.

Figure 7:
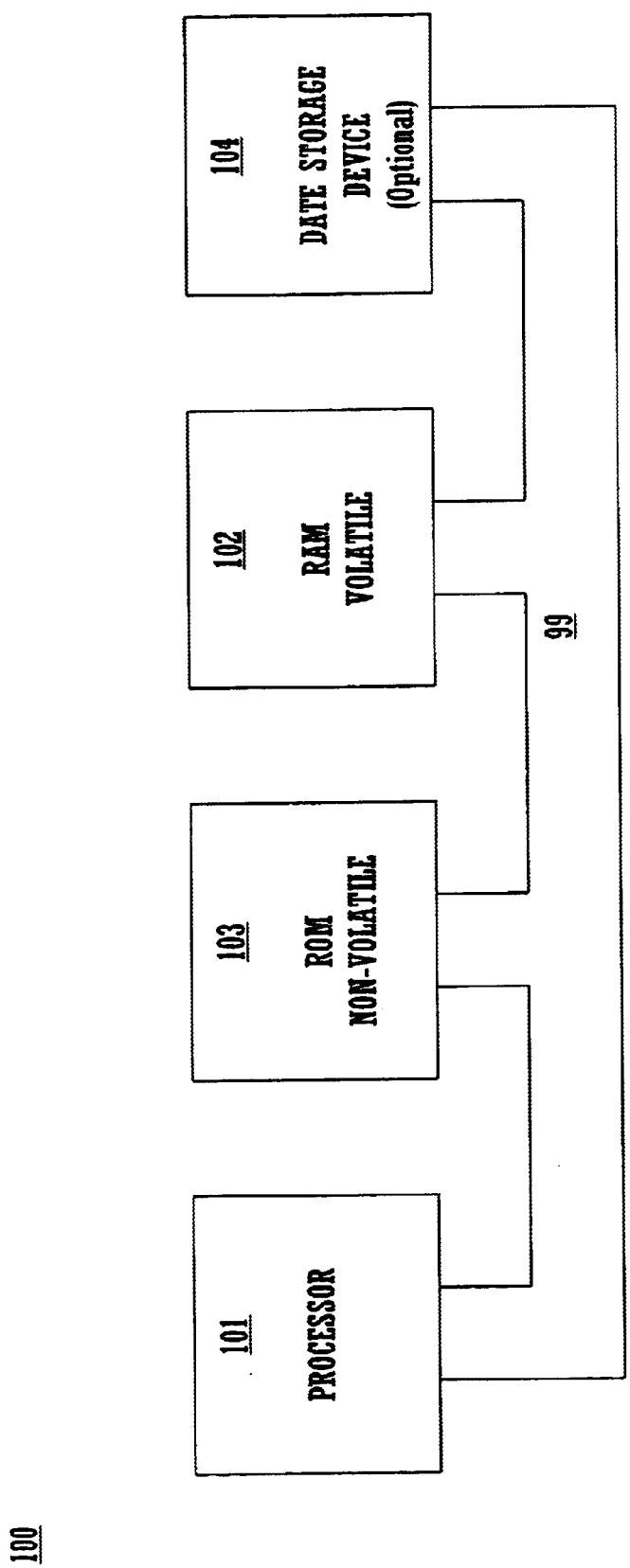
FIG. 7 is a block diagram of a computer system, which may be used as a platform to implement embodiments of the present invention.

FIG. 7 illustrates circuitry of computer system 100, which may form a platform for a portion of the any of the nodes. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

The preferred embodiment of the present invention, a system and method for partitioning an extended network of IEEE 1394b devices into subclusters of fully capable nodes which arbitrate with the 1394b standard and subclusters of partially capable nodes which arbitrate using the 1394a standard, is thus described. While the present invention has been described in particular embodiments, it should be appreciated that the present invention should not be construed as limited by such embodiments, but rather construed according to the below claims.

What is claimed is:

1. A network system for transferring information between devices, comprising:
   a plurality of partially compliant 1394b nodes each comprising:
      a first port operable to arbitrate using an IEEE 1394a compliant communication protocol and comprising a physical layer compliant with an IEEE 1394a standard; and
      a second port operable to arbitrate using the IEEE 1394a compliant communication protocol and comprising a physical layer compliant with an IEEE 1394b standard;
   a first and a second of said plurality of partially compliant 1394b nodes coupled together by their respective second ports; and
   said first port of one of said plurality of partially compliant 1394b nodes coupled to a 1394a compliant node.

2. The system of claim 1 further comprising:
   a plurality of fully compliant 1394b nodes each comprising:
      a first port operable to arbitrate using the IEEE 1394a compliant communication protocol and comprising a physical layer compliant with an IEEE 1394b standard; and
      a second port operable to arbitrate using an IEEE 1394b compliant communication protocol and comprising a physical layer compliant with an IEEE 1394b standard;
   a first and a second of said plurality of fully compliant 1394b nodes coupled together by their respective said second ports; and
   said first port of one of said plurality of fully compliant 1394b nodes coupled to said second port of one of said plurality of partially compliant 1394b nodes.

3. The system of claim 2 wherein said first port of one of said plurality of fully compliant 1394b nodes and said second port of one of said plurality of partially compliant 1394b nodes are coupled via an IEEE 1394b serial communication link.

4. The system of claim 1 wherein said first port of said one of said plurality of partially compliant 1394b nodes and said 1394a compliant node are coupled via an IEEE 1394a serial communication link.

5. In a network of nodes, a method of facilitating communication between said nodes comprising the steps of:
   a) establishing a connection on a 1394a compliant physical link between a first node and a second node;
   b) said first node and said second node arbitrating with a 1394a compliant communication protocol;
   c) establishing a connection on a 1394b compliant physical link between said second node and a third node; and
   d) said second node and said third node arbitrating using said 1394a compliant communication protocol.

6. The method of claim 5 further comprising the steps of:
   e) establishing a connection between said third node and a fourth node over an 1394a compliant physical link; and
   f) said third node and said fourth node arbitrating using said 1394a compliant protocol.

7. The method of claim 5 further comprising the steps of:
   e) establishing a connection over a 1394b compliant physical link between said third node and a fourth node; and
   f) said third node and said fourth node arbitrating using said 1394b compliant protocol.

8. The method of claim 7 further comprising the step of:

g) said third node negotiating a communication protocol with a fifth node.

9. The method of claim 5 further comprising the step of:

e) said first node converting a signal from a form suitable for transfer over said 1394a compliant physical link to a form suitable for transfer over said 1394b compliant physical link.

10. The method of claim 5 further comprising the step of:

e) said first node converting a signal from a form suitable for transfer over said 1394b compliant physical link to a form suitable for transfer over said 1394a compliant physical link.

11. A device providing for a communication interface on a bus, comprising:

a first port coupled to the device;

a second port coupled to the first port;

said first port comprising a physical layer which is compliant with an IEEE 1394a standard;

said second port comprising a physical layer which is compliant with an IEEE 1394b standard; and logic operable to perform an arbitration protocol over said first port and said second port said arbitration protocol compliant with an IEEE 1394a communication standard.

12. The device of claim 11 wherein the device further comprises:

logic operable to translate a signal from a form suitable for transfer over a IEEE 1394a serial communication link to a form suitable for transfer over a IEEE 1394b serial communication link.

13. The device of claim 11 wherein said first port is adapted to transfer information over an IEEE 1394a serial communication link.

14. The device of claim 11 wherein said second port is adapted to transfer information over an IEEE 1394b serial communication link.

* * * * *